(12) United States Patent  
Suh et al.

(10) Patent No.: US 9,102,555 B2  
(45) Date of Patent: Aug. 11, 2015

(54) METHOD FOR REMOVING PHOSPHORUS AND NITROGEN CONTAINED IN SEWAGE OR WASTEWATER USING IRON ORE WASTEWATER

(75) Inventors: Yong Jae Suh, Daejeon (KR); Myung Eun Ju, Daejeon (KR); Dae Sup Kil, Daejeon (KR); Hee Dong Jang, Daejeon (KR)

(73) Assignee: Korea Institute of Geosciences and Mineral Resources, Daejeon (KR)

( * ) Notice: Subject to any disclaimer, the term of this patent is extended or adjusted under 35 U.S.C. 154(b) by 925 days.

(21) Appl. No.: 13/306,855

(22) Filed: Nov. 29, 2011

(65) Prior Publication Data

US 2013/0105401 A1     May 2, 2013

(30) Foreign Application Priority Data

Nov. 2, 2011    (KR) .......................... 10-2011-113284

(51) Int. Cl.
    *C02F 1/52*       (2006.01)
    *C02F 1/66*       (2006.01)
    *C02F 101/10*     (2006.01)
    *C02F 101/16*     (2006.01)

(52) U.S. Cl.
    CPC ............... *C02F 1/52* (2013.01); *C02F 1/5236* (2013.01); *C02F 1/5245* (2013.01); *C02F 1/5254* (2013.01); *C02F 1/66* (2013.01); *C02F 2101/105* (2013.01); *C02F 2101/16* (2013.01)

(58) Field of Classification Search
    CPC ....................................................... C02F 1/52
    See application file for complete search history.

(56) References Cited

FOREIGN PATENT DOCUMENTS

| KR | 1019990011049 | 2/1999 |
|---|---|---|
| KR | 1020040070408 | 8/2004 |
| KR | 1020060102762 | 9/2006 |
| KR | 1020090086910 | 8/2009 |

*Primary Examiner* — Tony G Soohoo
*Assistant Examiner* — Peter Keyworth
(74) *Attorney, Agent, or Firm* — Bret E. Field; Bozicevic, Field & Francis LLP

(57) ABSTRACT

The present invention provides a method for removing phosphorus and nitrogen contained in sewage or wastewater using iron ore wastewater. According to the method of the present invention, in which the phosphorus and nitrogen contained in sewage or wastewater are crystallized in the form of struvite using iron ore wastewater containing a large amount of $Mg^{2+}$ produced in a process of upgrading low-grade iron ore and removed, it is possible to reduce the cost of $Mg^{2+}$ and the cost of iron ore wastewater treatment, thereby earning economic profits. Moreover, it is possible to prevent water pollution by the removal of the phosphorus and nitrogen contained in sewage or wastewater. Furthermore, it is possible to use struvite crystals obtained as a by-product as a time-release compound fertilizer so as to reduce the amount of fertilizer used and the number of fertilizations, thereby reducing soil contamination.

7 Claims, 4 Drawing Sheets

METHOD FOR REMOVING PHOSPHORUS AND NITROGEN CONTAINED IN SEWAGE OR WASTEWATER USING IRON ORE WASTEWATER

CROSS-REFERENCE TO RELATED APPLICATION

This application claims priority to and the benefit of Korean Patent Application No. 10-2011-113284, filed on Nov. 2, 2011, the disclosure of which is incorporated herein by reference in its entirety.

BACKGROUND

1. Field of the Invention

The present invention relates to a method for removing phosphorus and nitrogen contained in sewage or wastewater using iron ore wastewater and, more particularly, to a method for removing phosphorus and nitrogen contained in sewage or wastewater by crystallizing the phosphorus and nitrogen in the form of struvite using iron ore wastewater containing a large amount of $Mg^{2+}$ produced in a process of upgrading low-grade iron ore.

2. Discussion of Related Art

Recently, with the increase in the amount of nitrogen fertilizers, phosphorus fertilizers, etc. used due to soil degradation, a large amount of fertilizers are introduced into rivers, lakes, sea, etc., which promotes the growth of algae and causes eutrophication of rivers and sea. Moreover, a vicious circle in which the long-term accumulation of nitrogen fertilizers and phosphorus fertilizers in soils causes soil degradation to reduce the efficiency of cultivation is repeated. Furthermore, the introduction of phosphorus and nitrogen, which are contained in sewage or wastewater, into the coastal water causes the red tide phenomenon and decomposes in deep water to causes odor in serious case, thereby accelerating water pollution. Therefore, to prevent the water pollution, the phosphorus and nitrogen contained in the sewage or wastewater must be removed before being introduced into rivers or lakes.

Accordingly, the concentration of phosphorus and nitrogen contained in the sewage or wastewater is controlled below a predetermined level and is expected to be more stringently controlled in the future. According to the water quality standards for effluent of sewage treatment plant, which have been published on Apr. 2, 2010 by the Ministry of Environment of Republic of Korea, it has been reported that the regulation of the concentration of total phosphorus would be strengthened from 4 ppm to 0.2 ppm from 2013. Accordingly, it is inevitably necessary to employ a chemical method for additionally removing phosphorus from sewage or wastewater.

The chemical method for removing the nitrogen and phosphorus contained in the sewage or wastewater includes a method of precipitating phosphate ions ($PO_4^{3-}$) by adding $MgCl_2$, $Al_2(SO_4)_3$, $FeCl_3$, etc. to the sewage or wastewater. However, this method requires high cost. Therefore, in order to reduce the processing costs of several hundreds of billions to several trillion Korean Wons, extensive research has been devoted to the crystallization of phosphorus and nitrogen in the form of struvite. As an example thereof, Korean Patent Publication No. 10-1997-20973 and Korean Patent No. 10-572516 disclose a wastewater treatment method for removing phosphorus and nitrogen contained in sewage or wastewater by crystallizing the phosphorus and nitrogen in the form of struvite (i.e., ammonium magnesium phosphate hydrate, $NH_4MgPO_4 \cdot 6H_2O$) using seawater or bittern which contains a large amount of $Mg^{2+}$. Moreover, Korean Patent No. 10-1019200 discloses a method for forming a great amount of struvite by mixing a solution containing phosphate ions ($PO_4^{3-}$) with wastewater containing excess nitrogen to be subjected to anaerobic treatment, and supplying a solution containing Mg/Ca ions to the resulting mixture to form struvite. According to this method, the amount of alkaline chemicals used can be minimized, and the nitrogen can be removed from the wastewater containing excess nitrogen.

However, during the removal of phosphorus and nitrogen by struvite crystallization using seawater or bittern in the above manner, materials that inhibit struvite crystallization and excess sodium ions ($Na^+$), which may pollute rivers when the sewage is discharged, as well as $Mg^{2+}$ are present. Therefore, for the purpose of improving the efficiency of struvite crystallization, various methods for pretreating the materials that inhibit struvite crystallization have been studied. As an example thereof, Korean Patent Publication No. 10-1999-11049 discloses a method for removing phosphoric acid wastewater containing ammoniacal nitrogen in such a manner that slaked lime or quick lime slurry is added to phosphoric acid wastewater containing ammoniacal nitrogen to control the pH to 2.0 to 5.5, fluorine in the wastewater is precipitated and removed such that that only the phosphorus and ammoniacal nitrogen are present in a dissolved state in a supernatant, a Mg compound and a pH adjustment chemical are added to the supernatant to control the pH to 6.0 to 10.5, and the ammoniacal nitrogen is precipitated in the form of struvite and removed. Moreover, Korean Patent Publication No. 10-2006-102762 discloses a method for removing nitrogen by struvite crystallization, which removes components that inhibit struvite crystallization using ferrous salt, Alum and other flocculants and then improves the removal efficiency of nitrogen and phosphorus in a struvite crystallization reactor.

However, although the materials and components that inhibit struvite crystallization can be removed using the methods disclosed in the above patent documents, the use of chemicals such as $MgCl_2$, $Mg(OH)_2$ and MgO as a source of $Mg^{2+}$ increases the costs, and the use of seawater or bittern as a source of $Mg^{2+}$ requires the transfer of seawater or bittern to a sewage or wastewater treatment plant, which causes additional logistics costs, thereby reducing the economic efficiency. Moreover, the logistics costs incurred in transferring a large volume of seawater can be reduced when the sewage or wastewater treatment plant is located near the sea, which makes it difficult to apply to all the sewage or wastewater treatment plants.

Therefore, a new method is required to inexpensively provide a source of $Mg^{2+}$ used for the removal of phosphorus and nitrogen by struvite crystallization.

Meanwhile, iron ore produced at the Shinyemi mine in Gangwon-do, South Korea has an average Fe content of 40% and is a low-grade ore containing MgO and $SiO_2$ as main impurities. During a process of upgrading the low-grade iron ore to be used as an industrial raw material, the Fe contained in the iron ore is recovered, and wastewater produced at this time contains a large amount of $Mg^{2+}$. Therefore, it is considered that when the iron ore wastewater containing a large amount of $Mg^{2+}$ is used as a source of $Mg^{2+}$ in the process for removing phosphorus and nitrogen by struvite crystallization, the cost of wastewater treatment can be reduced.

Therefore, the need for research on the process for removing phosphorus and nitrogen contained in sewage or wastewater using iron ore wastewater containing a large amount of $Mg^{2+}$ is urgently required.

SUMMARY OF THE INVENTION

While the inventors of the present invention have studied about the method for removing phosphorus and nitrogen contained in sewage or wastewater using an inexpensive source of $Mg^{2+}$, they found that the phosphorus (P) contained in sewage or wastewater can be efficiently removed by crystallizing the phosphorus and nitrogen contained in the sewage or wastewater in the form of struvite using iron ore wastewater containing a large amount of $Mg^{2+}$ produced in a process of upgrading low-grade iron ore, and completed the present invention.

Therefore, the present invention provides a method for removing phosphorus and nitrogen contained in sewage or wastewater by crystallizing the phosphorus and nitrogen in the form of struvite using iron ore wastewater containing a large amount of $Mg^{2+}$.

An object of the present invention is to provide a method for removing phosphorus and nitrogen contained in sewage or wastewater using iron ore wastewater, comprising:

(1) obtaining iron ore leachate by adding iron ore powder to an acidic solution and stirring the mixture at 90 to 110° C. for 1 to 3 hours;

(2) diluting the iron ore leachate with distilled water and separating and discharging residual undissolved powder by centrifugation;

(3) adjusting the pH of the iron ore leachate to 7.5 to 9 and obtaining a precipitate of iron hydroxide and a supernatant containing $Mg^{2+}$ by centrifugation; and (4) adding the supernatant containing $Mg^{2+}$ obtained in step (3) to a mixed solution of a phosphate ($PO_4^{3-}$) solution and an ammonium salt ($NH_4^+$) solution, adjusting the pH of the reaction solution to 7.5 to 9, stirring the resulting mixture at room temperature, and removing a precipitate of struvite by filtration, in which the molar ratio of phosphorus (P) ions to nitrogen (N) ions to magnesium (Mg) ions is 1:3:0.5 to 2.

Hereinafter, the present invention will be described in detail.

The method for removing phosphorus and nitrogen contained in sewage or wastewater according to the present invention is characterized in that the phosphorus and nitrogen contained in sewage or wastewater are crystallized in the form of struvite using iron ore wastewater containing a large amount of $Mg^{2+}$ produced in a process of upgrading low-grade iron ore and removed.

The method for removing phosphorus and nitrogen contained in sewage or wastewater according to the present invention will be described in more detail step by step as follows.

Step (1) is to obtain iron ore leachate as follows. First, after raw iron ore is crushed, iron ore powder less than 149 microns is sieved through a No. 100 sieve. The sieved iron ore powder is added to an acidic solution and stirred at 90 to 110° C. for 1 to 3 hours, thereby obtaining iron ore leachate.

Preferably, the acidic solution may be, but not limited to, a hydrochloric acid solution or a sulfuric acid solution.

In step (2), the iron ore leachate is diluted with distilled water and centrifuged to separate residual undissolved powder.

Step (3) is to obtain iron ore wastewater containing $Mg^{2+}$ as follows. A 2 M NaOH solution is slowly added to the iron ore leachate obtained in step (2) to be neutralized to a pH of the leachate 7.5 to 9, preferably 8. Here, if the pH of the leachate reaches about 4, trivalent iron hydroxide ($Fe(OH)_3$) is precipitated and, if the pH reaches about 8, bivalent iron hydroxide ($Fe(OH)_2$) is precipitated. This leachate is centrifuged to obtain a precipitate of iron hydroxide and a supernatant containing $Mg^{2+}$. The iron hydroxide is used as a raw material for forming an iron compound and the supernatant is used as a raw material for forming struvite.

Step (4) is to form and remove struvite crystals as follows. After the supernatant containing $Mg^{2+}$ obtained in step (3) is added to a mixed solution of a phosphate ($PO_4^{3-}$) solution and an ammonium salt ($NH_4^+$) solution, the pH of the reaction solution is adjusted to 7.5 to 9, preferably 8, and the resulting mixture is stirred at room temperature and filtered, thereby recovering a precipitate of struvite crystals. The recovered struvite crystals are dried at 40° C.

The phosphate ($PO_4^{3-}$) solution may include, but not limited to, $Na_2HPO_4$ solution, $NaH_2PO_4$ solution, $K_2HPO_4$ solution, and $KH_2PO_4$ solution. The ammonium salt ($NH_4^+$) solution may include, but not limited to, $NH_4Cl$ solution, $(NH_4)_2SO_4$ solution, $NH_4NO_3$ solution, and $(NH_4)_2CO_3$ solution.

Preferably, the molar ratio of phosphorus (P) ions to nitrogen (N) ions to magnesium (Mg) ions, which are used in the formation of struvite crystals, is 1:3:0.5 to 2.

Typically, the phosphorus (P) and nitrogen (N) are contained in sewage digestive fluid as an intermediate product discharged from a sewage treatment plant in amounts of 200 ppm and 1,000 ppm, respectively, and thus the nitrogen is excessive contained more than the phosphorus. That is, the phosphorus and nitrogen are contained in the sewage digestive fluid in a molar ratio of 1:5. When the amount of nitrogen added is two times higher than that of phosphorus, most of the phosphorus is crystallized in the form of struvite, and thus the molar ratio of phosphorus (P) to nitrogen (N) is fixed to 1:3. Moreover, in order to identify the phosphorus removal efficiency with respect to the amount of magnesium (Mg) added, the molar ratio of phosphorus (P) ions to nitrogen (N) ions to magnesium (Mg) ions is changed to 1:3:0.5 to 2.

Moreover, the method for removing phosphorus and nitrogen contained in sewage or wastewater according to the present invention may further comprise, after step (2), adding a polymer flocculant solution to the iron ore leachate, stirring the resulting mixture, and removing flocculated particles of a silica-polymer flocculant by centrifugation.

The polymer flocculant solution may be prepared by dissolving 0.2 to 0.5 wt % of polymer flocculant in 100 ml of distilled water. Preferably, the polymer flocculant may be a non-ionic organic polymer flocculant. The non-ionic organic polymer flocculant may include: polyethylene oxide (PEO); polyethylene glycol alkyl ethers such as polyethylene glycol dodecyl ether, polyethylene glycol tridecyl ether, polyethylene glycol hexadecyl ether, polyethylene glycol octadecyl ether, etc.; polyethylene glycol alkyl phenyl ethers such as polyoxyethylene isooctylphenyl ether, polyoxyethylene tetramethylbutyl phenyl ether, etc.; polysorbates such as polyoxyethylene sorbitan monolaurate, polyoxyethylene sorbitan monostearate, polyoxyethylene sorbitan monooleate, etc.; and poloxamer, but not limited thereto.

As a result of measuring the concentration of phosphorus (P) in the filtrate obtained by removing the struvite crystals formed in the above manner from the sewage or wastewater containing phosphorus and nitrogen, when the molar ratio of phosphorus (P) to magnesium (Mg) is 1:0.5 to 2, the phosphorus removal efficiency is about 90% or higher. In particular, when the molar ratio of phosphorus (P) to magnesium (Mg) is 1:1, the phosphorus removal efficiency is about 99% or higher. Moreover, when the phosphorus is removed using the iron ore wastewater with or without silica, the phosphorus removal efficiencies are almost the same as each other. Accordingly, it is considered that the concentration of magnesium (Mg) ions in the iron ore wastewater is a key factor that has an effect on the formation of struvite crystals, and the residual silica in the wastewater or the type of strong acid used for the leaching do not significantly affect the formation of struvite crystals.

As such, according to the method for removing phosphorus and nitrogen contained in sewage or wastewater of the present invention, in which the phosphorus and nitrogen contained in sewage or wastewater are crystallized in the form of struvite using iron ore wastewater containing a large amount of $Mg^{2+}$ produced in a process of upgrading low-grade iron ore and removed, it is possible to reduce the cost of $Mg^{2+}$ and the cost of iron ore wastewater treatment, thereby earning economic profits. Moreover, according to the method for removing phosphorus and nitrogen contained in sewage or wastewater of the present invention, it is possible to prevent water pollution by the removal of the phosphorus and nitrogen contained in sewage or wastewater. Furthermore, it is possible to use struvite crystals obtained as a by-product as a time-release compound fertilizer so as to reduce the amount of fertilizer used and the number of fertilizations, thereby reducing soil contamination.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, preferred examples are provided for a better understanding of the present invention. However, the following examples are not intended to limit the scope of the invention.

EXAMPLE 1

Method for Removing Phosphorus and Nitrogen Contained in Sewage or Wastewater Using Iron Ore Wastewater 1. Preparation of Hydrochloric Acid Leachate (Wastewater Including $Mg^{2+}$ as Main Component) Containing Silica From Raw Iron Ore After raw iron ore was crushed, iron ore powder less than 149 microns was sieved through a No. 100 sieve. 25 g of sieved iron ore powder and 100 ml of 4 M hydrochloric acid were placed in a 1 L beaker and stirred at 100° C. for 2 hours, thereby obtaining iron ore leachate. 100 ml of distilled water was added to the iron ore leachate to be diluted, and the resulting iron ore leachate was centrifuged at 10,000 rpm for 10 minutes to separate and discharge residual undissolved powder. A 2 M NaOH solution was slowly added to the iron ore leachate to be neutralized to a pH of 8. The resulting leachate was centrifuged at 10,000 rpm for 10 minutes to obtain a precipitate of iron hydroxide and a supernatant containing $Mg^{2+}$. The iron hydroxide was used as a raw material for forming an iron compound and the supernatant was used as a raw material for forming struvite.

2. Removal of Phosphorus and Nitrogen Using Hydrochloric Acid Leachate Containing Silica A phosphate solution having a concentration of 1,000 ppm was prepared by dissolving 0.299 g of $Na_2HPO_4$ in 100 ml of distilled water. An ammonium salt solution was prepared by dissolving 0.339 g of $NH_4Cl$ in 50 ml of distilled water. A mixed solution containing phosphorus and nitrogen was prepared by mixing the phosphate solution with the ammonium salt solution. Here, the molar ratio of phosphorus (P) ions to nitrogen (N) ions was 1:3.

The supernatant containing $Mg^{2+}$ obtained in the above step 1 was added to the mixed solution containing phosphorus and nitrogen. Here, the molar ratio of magnesium (Mg) ions to phosphorus (P) ions was set to 0.5 to 2. Then, the pH of the reaction solution was adjusted to 8 using a 1 M NaOH solution. The reaction solution was stirred at room temperature for 1 hour and filtered to separate a precipitate (struvite) and a filtrate. The precipitate was dried at 40° C. and recovered, and the filtrate was used to analyze the concentration of phosphorus (P).

Figure 1:
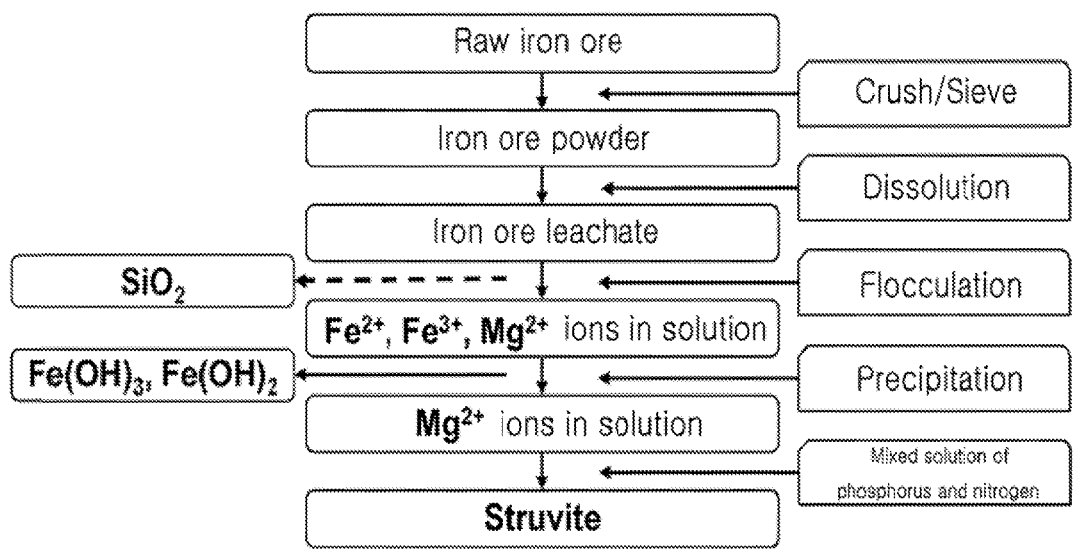
FIG. 1 is a schematic diagram showing a process of crystallizing phosphorus and nitrogen contained in sewage or wastewater in the form of struvite using iron ore wastewater containing a large amount of $Mg^{2+}$.
Figure 2:
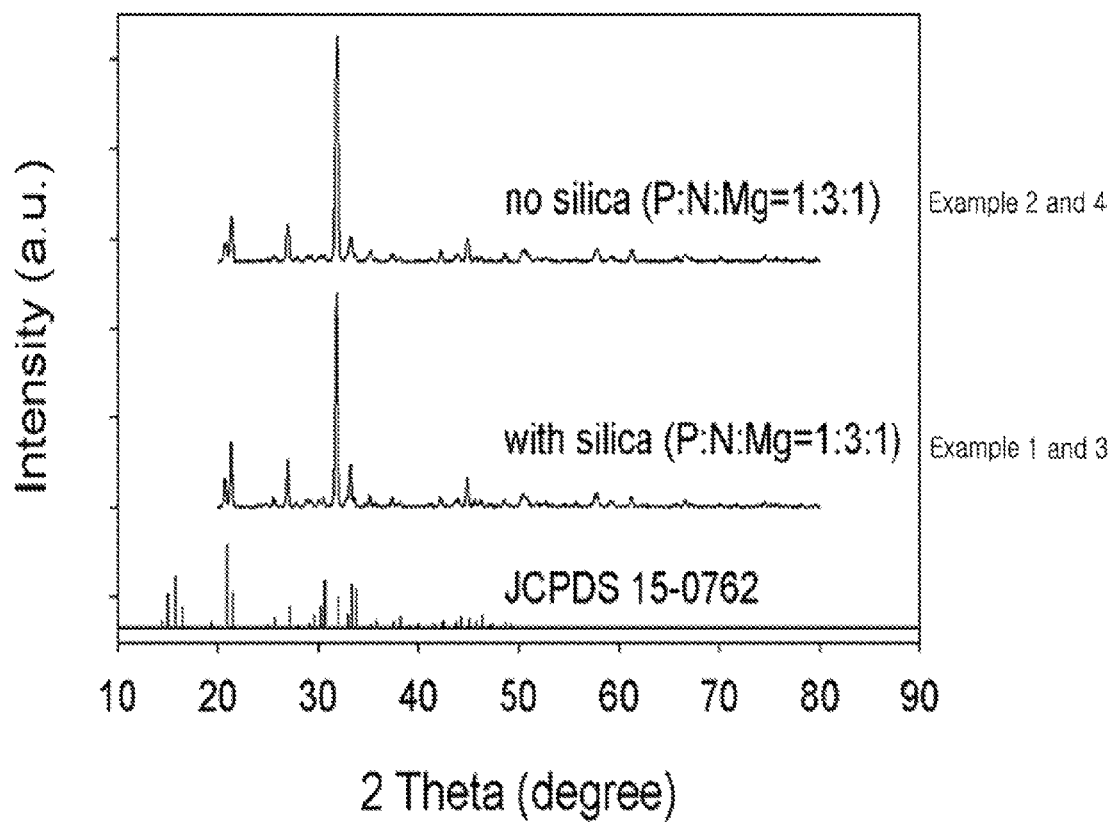
FIG. 2 shows an X-ray diffraction pattern of a struvite crystal structure formed by the method of the present invention.

FIG. 1 shows a process of crystallizing phosphorus and nitrogen contained in sewage or wastewater in the form of struvite using iron ore wastewater containing a large amount of $Mg^{2+}$. FIG. 2 shows an X-ray diffraction pattern (XRD, Rigaku Denki Co., Model RU-200B) of the struvite crystal structure formed in the above manner.

As shown in FIG. 2, it can be seen that the main peaks of XRD JCPDS card No. 15-0762 coincide with those of the struvite crystal structure formed in Example 1.

EXAMPLE 2

Method for Removing Phosphorus and Nitrogen Contained in Sewage or Wastewater Using Iron Ore Wastewater 1. Preparation of Hydrochloric Acid Leachate (Wastewater Including $Mg^{2+}$ as Main Component) Containing No Silica From Raw Iron Ore After raw iron ore was crushed, iron ore powder less than 149 microns was sieved through a No. 100 sieve. 25 g of sieved iron ore powder and 100 ml of 4 M hydrochloric acid were placed in a 1 L beaker and stirred at 100° C. for 2 hours, thereby obtaining iron ore leachate. 100 ml of distilled water was added to the iron ore leachate to be diluted, and the resulting iron ore leachate was centrifuged at 10,000 rpm for 10 minutes to separate and discharge residual undissolved powder. A solution prepared by dissolving 0.25 wt % of polyethylene oxide (PEO) as a polymer flocculant in 100 ml of distilled water was added to the iron ore leachate, and the resulting iron ore leachate was stirred for 30 minutes and centrifuged at 10,000 rpm for 10 minutes, thereby removing silica-PEO flocculated particles. A 2 M NaOH solution was slowly added to the iron ore leachate, from which silica was removed, to be neutralized to a pH of 8. The resulting leachate was centrifuged at 10,000 rpm for 10 minutes to obtain a precipitate of iron hydroxide and a supernatant containing $Mg^{2+}$.

2. Removal of Phosphorus and Nitrogen Using Hydrochloric Acid Leachate Containing No Silica A precipitate (struvite) and a filtrate were separated in the same manner as in Example 1-2. FIG. 2 shows the X-ray diffraction pattern of the crystal structure of the thus formed struvite.

As shown in FIG. 2, it can be seen that the main peaks of XRD JCPDS card No. 15-0762 coincide with those of the struvite crystal structure formed in Example 2.

EXAMPLE 3

Method for Removing Phosphorus and Nitrogen Contained in Sewage or Wastewater Using Iron Ore Wastewater 1. Preparation of Sulfuric Acid Leachate (Wastewater Including $Mg^{2+}$ as Main Component) Containing Silica From Raw Iron Ore A supernatant containing $Mg^{2+}$ was obtained in the same manner as in Example 1-1, except that a sulfuric acid solution was used instead of the hydrochloric acid solution.

2. Removal of Phosphorus and Nitrogen Using Sulfuric Acid Leachate Containing Silica A precipitate (struvite) and a filtrate were separated in the same manner as in Example 1-2. FIG. 2 shows the X-ray diffraction pattern of the crystal structure of the thus formed struvite.

As shown in FIG. 2, it can be seen that the main peaks of XRD JCPDS card No. 15-0762 coincide with those of the struvite crystal structure formed in Example 3.

EXAMPLE 4

Method for Removing Phosphorus and Nitrogen Contained in Sewage or Wastewater Using Iron Ore Wastewater 1. Preparation of Sulfuric Acid Leachate (Wastewater Including $Mg^{2+}$ as Main Component) Containing No Silica From Raw Iron Ore A supernatant containing $Mg^{2+}$ was obtained in the same manner as in Example 2-1, except that a sulfuric acid solution was used instead of the hydrochloric acid solution.

2. Removal of Phosphorus and Nitrogen Using Sulfuric Acid Leachate Containing No Silica A precipitate (struvite) and a filtrate were separated in the same manner as in Example 2-2. FIG. 2 shows the X-ray diffraction pattern of the crystal structure of the thus formed struvite.

As shown in FIG. 2, it can be seen that the main peaks of XRD JCPDS card No. 15-0762 coincide with those of the struvite crystal structure formed in Example 4.

EXPERIMENTAL EXAMPLE 1

Measurement of Phosphorus (P) Concentration

In order to measure the concentration of phosphorus (P) in the filtrate from which the struvite crystals obtained in Examples 1 to 4 were removed, the measurement was performed according to a method proposed by Standard Test Method for Determination of Phosphorus in Iron Ores by Photometric Method (ASTM E1070). According to this standard, the concentration of phosphorus (P) can be measured over a concentration range of 0.005% to 1.0% of phosphorus contained in the iron ore.

Figure 3:
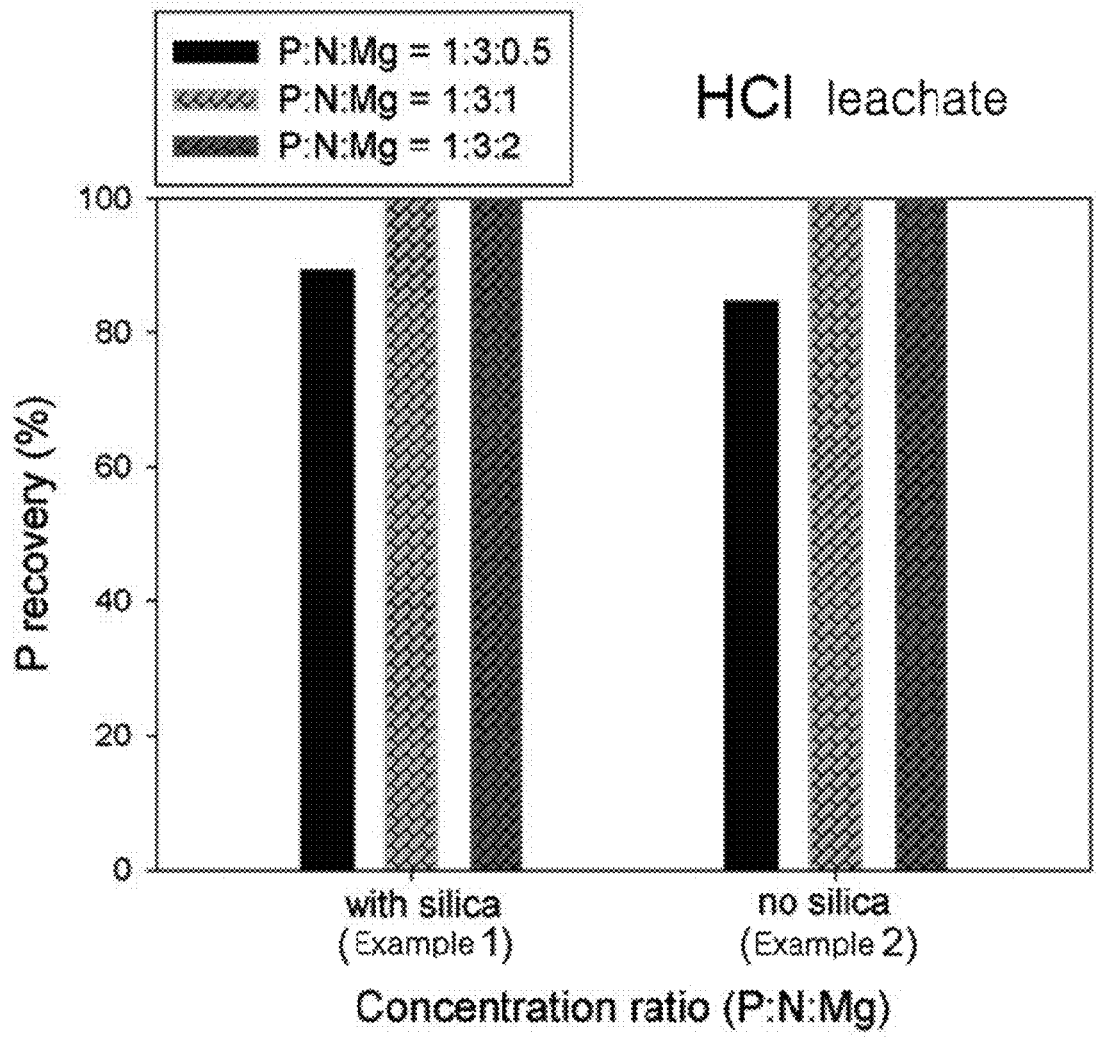
FIG. 3 shows a phosphorus removal efficiency in a filtrate from which struvite crystals obtained in Examples 1 and 2 of the present invention are removed.
Figure 4:
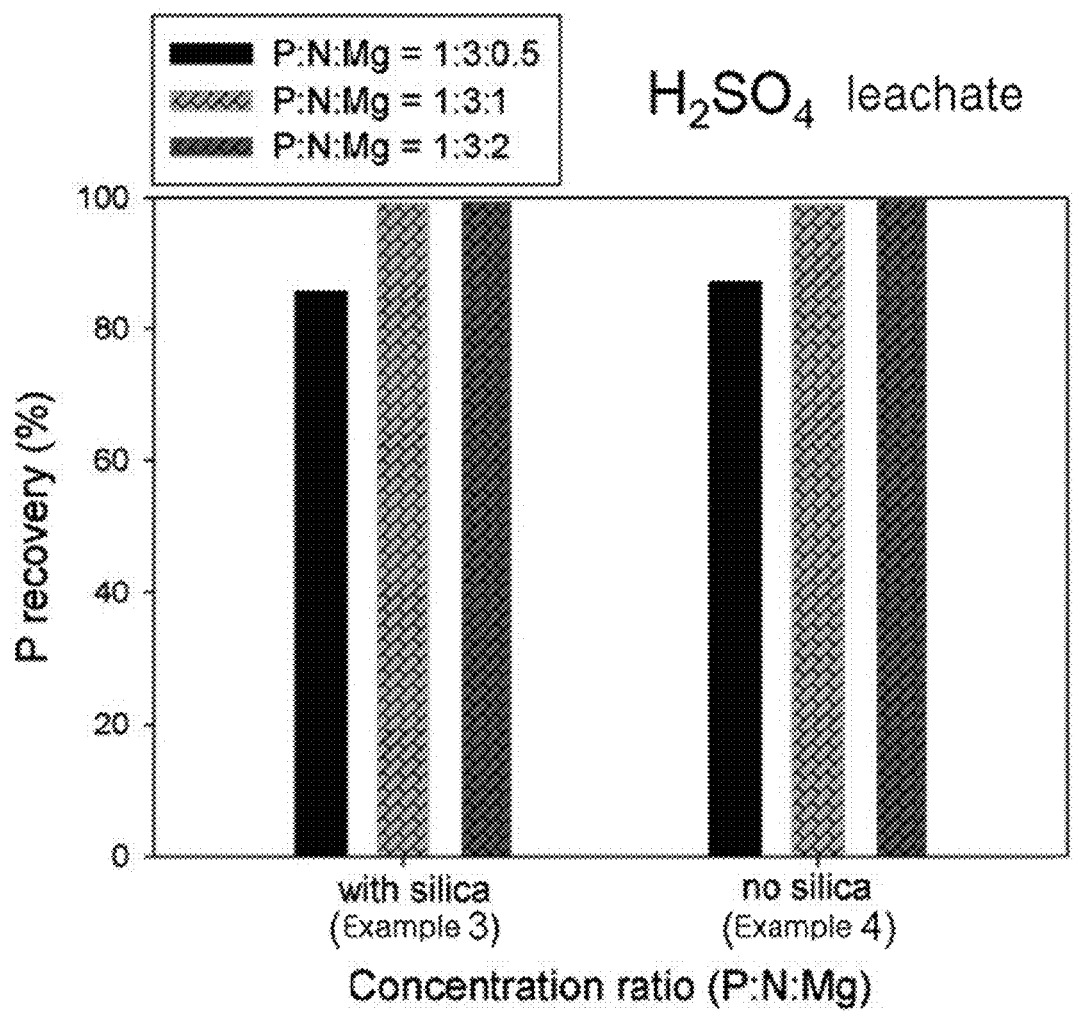
FIG. 4 a phosphorus removal efficiency in a filtrate from which struvite crystals obtained in Examples 3 and 4 of the present invention are removed.

FIGS. 3 and 4 show the phosphorus removal efficiency in the filtrate from which the struvite crystals obtained in Examples 1 to 4 were removed.

As shown in FIGS. 3 and 4, it can be seen that when the molar ratio of phosphorus (P) to magnesium (Mg), which were used in the crystallization of the phosphorus and nitrogen in the form of the struvite, was 1:0.5 to 2, the phosphorus removal efficiency was about 90% or higher. In particular, it can be seen that when the molar ratio of phosphorus (P) to magnesium (Mg) was 1:1, the phosphorus removal efficiency was about 99% or higher. Moreover, it can be seen that when the phosphorus was removed using the iron ore wastewater with or without silica, the phosphorus removal efficiencies were almost the same as each other. Accordingly, it is considered that the concentration of magnesium (Mg) ions in the iron ore wastewater is a key factor that has an effect on the formation of struvite crystals, and the residual silica in the wastewater or the type of strong acid used for the leaching do not significantly affect the formation of struvite crystals.

As described above, according to the method for removing phosphorus and nitrogen contained in sewage or wastewater of the present invention, the phosphorus and nitrogen contained in sewage or wastewater are crystallized in the form of struvite using iron ore wastewater containing a large amount of $Mg^{2+}$ and removed. As a result, it is possible to economically prevent water pollution and soil contamination.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for removing phosphorus and nitrogen contained in sewage or wastewater using iron ore wastewater, comprising:
   (1) obtaining iron ore leachate by adding iron ore powder to an acidic solution and stirring the mixture at 90 to 110° C. for 1 to 3 hours;
   (2) diluting the iron ore leachate with distilled water and separating and discharging residual undissolved powder by centrifugation;
   (3) adjusting the pH of the iron ore leachate to 7.5 to 9 and obtaining a precipitate of iron hydroxide and a supernatant containing $Mg^{2+}$ by centrifugation; and
   (4) adding the supernatant containing $Mg^{2+}$ obtained in step (3) to a mixed solution of a phosphate ($PO_4^{3-}$) solution and an ammonium salt ($NH_4^+$) solution, adjusting the pH of the reaction solution to 7.5 to 9, stirring the resulting mixture at room temperature, and removing a precipitate of struvite by filtration,
   wherein the molar ratio of phosphorus (P) ions to nitrogen (N) ions to magnesium (Mg) ions is 1:3:0.5 to 2.

2. The method of claim 1, wherein the acidic solution of step (1) is a hydrochloric acid solution or a sulfuric acid solution.

3. The method of claim 1, wherein the iron hydroxide of step (3) is $Fe(OH)_3$ or $Fe(OH)_2$.

4. The method of claim 1, wherein the phosphate ($PO_4^{3-}$) solution of step (4) comprises at least one selected from the group consisting of $Na_2HPO_4$ solution, $NaH_2PO_4$ solution, $K_2HPO_4$ solution, and $KH_2PO_4$ solution.

5. The method of claim 1, wherein the ammonium salt ($NH_4^+$) solution of step (4) comprises at least one selected from the group consisting of $NH_4Cl$ solution, $(NH_4)_2SO_4$ solution, $NH_4NO_3$ solution, and $(NH_4)_2CO_3$ solution.

6. The method of claim 1, further comprising, after step (2), adding a polymer flocculant solution to the iron ore leachate, stirring the resulting mixture, and removing flocculated particles by centrifugation.

7. The method of claim 6, wherein the polymer flocculant solution comprises at least one selected from the group consisting of polyethylene oxide (PEO), polyethylene glycol dodecyl ether, polyethylene glycol tridecyl ether, polyethylene glycol hexadecyl ether, polyethylene glycol octadecyl ether, polyoxyethylene isooctylphenyl ether, polyoxyethylene tetramethylbutyl phenyl ether, polyoxyethylene sorbitan monolaurate, polyoxyethylene sorbitan monostearate, polyoxyethylene sorbitan monooleate, and poloxamer.

\* \* \* \* \*